(12) United States Patent
Wong

(10) Patent No.: US 7,769,372 B1
(45) Date of Patent: Aug. 3, 2010

(54) SELECTIVELY ACTIVATED MULTI-SUBCARRIER (SAMS) RADIO TRANSCEIVER MEASURING TECHNIQUES

(75) Inventor: Hee Wong, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 390 days.

(21) Appl. No.: 10/887,243

(22) Filed: Jul. 8, 2004

(51) Int. Cl.
*H04W 24/00* (2009.01)

(52) U.S. Cl. ............... 455/423; 455/126; 370/207; 370/232

(58) Field of Classification Search ............... 455/450, 455/115.1–115.4, 226.1–226.11, 302, 456, 455/566, 126; 702/76, 69; 375/260, 224; 370/208; 716/6; 714/744, 733
See application file for complete search history.

(56) References Cited

U.S. PATENT DOCUMENTS

| | | | | |
|---|---|---|---|---|
| 6,134,445 A | * | 10/2000 | Gould et al. ............ | 455/456.3 |
| 6,263,289 B1 | * | 7/2001 | Hassun et al. ............ | 702/69 |
| 6,671,848 B1 | * | 12/2003 | Mulig et al. ............ | 714/744 |
| 6,882,946 B2 | * | 4/2005 | Bell ............ | 702/76 |
| 7,123,889 B2 | * | 10/2006 | Scheck et al. ............ | 455/115.1 |
| 7,145,956 B2 | * | 12/2006 | Koifman ............ | 375/260 |
| 2003/0162521 A1 | * | 8/2003 | Vorenkamp et al. ............ | 455/302 |
| 2003/0217345 A1 | * | 11/2003 | Rajsuman et al. ............ | 716/6 |
| 2004/0125742 A1 | * | 7/2004 | Schmidt ............ | 370/208 |
| 2005/0031047 A1 | * | 2/2005 | Maltsev et al. ............ | 375/260 |
| 2005/0130610 A1 | * | 6/2005 | Scheck et al. ............ | 455/126 |
| 2005/0192018 A1 | * | 9/2005 | Jang ............ | 455/450 |
| 2006/0146962 A1 | * | 7/2006 | Troya et al. ............ | 375/340 |

* cited by examiner

*Primary Examiner*—Charles N Appiah
*Assistant Examiner*—Michael T Vu

(57) ABSTRACT

Testing of a wireless transceiver employs a selectively activated multi-subcarrier test vector or corresponding waveform for which all subcarriers are activated except subcarriers below a selected subcarrier fundamental and harmonics of the selected subcarrier fundamental. Use of selectively activated multi-subcarrier testing allows measurement of inter-modulation distortion, harmonic distortion, frequency response, and phase noise using a common spectrum analyzer, with individual results pinpointing sources of impairment.

20 Claims, 7 Drawing Sheets

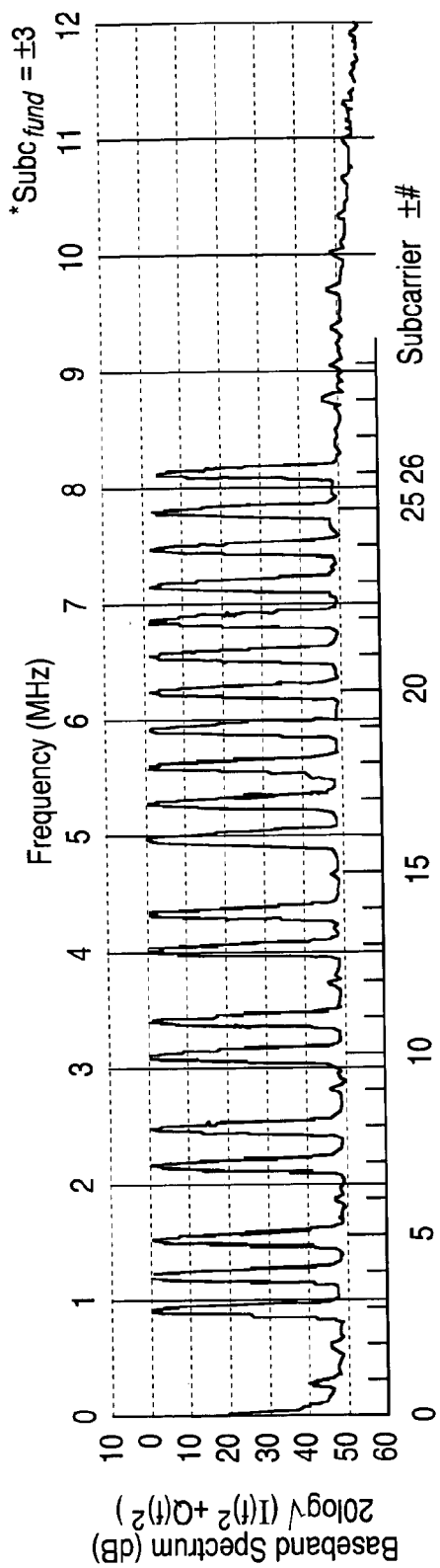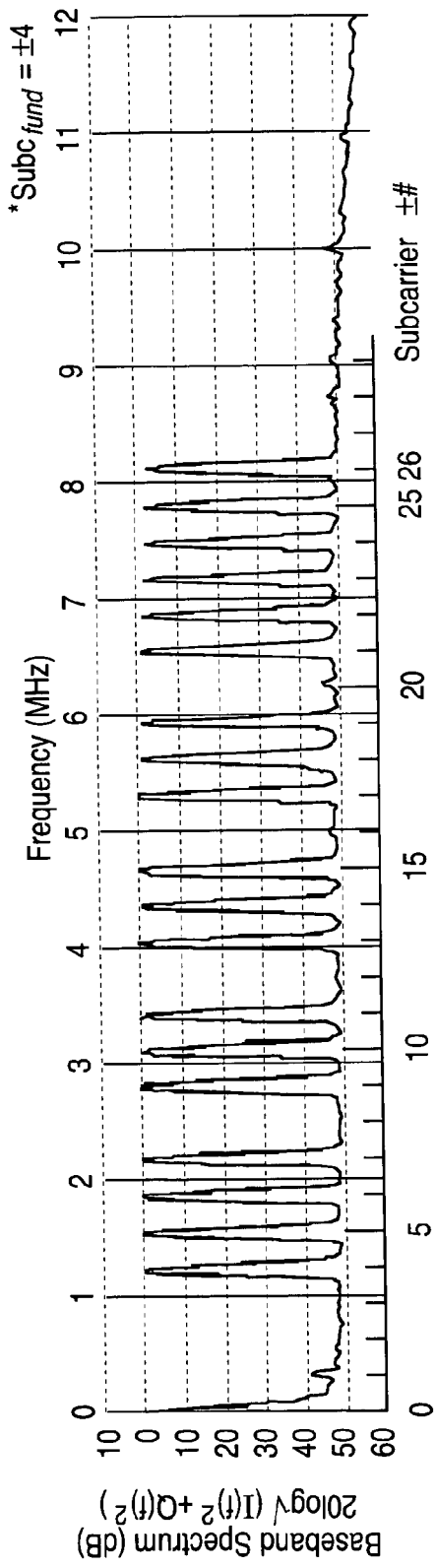
FIG. 5A
FIG. 5B

SELECTIVELY ACTIVATED MULTI-SUBCARRIER (SAMS) RADIO TRANSCEIVER MEASURING TECHNIQUES

TECHNICAL FIELD OF THE INVENTION

The present invention is directed, in general, to testing of radio transceivers and, more specifically, to performance measurement for wide band multi-carrier or multi-subcarrier systems.

BACKGROUND OF THE INVENTION

Orthogonal frequency division multiplexing (OFDM) modulation has found widespread acceptance in many wireless communication systems, such as Wireless Local Area Network (WLAN) architectures, Digital Audio/Video Broadcasting (DAB/DVB) transmission, and mobile radios. An OFDM-based radio distributes data over a large number of modulated subcarriers spaced apart at precise frequencies, as illustrated by the gain-frequency plots in FIG. 9. FIG. 9 depicts an OFDM, unmodulated subcarrier (top plot) and the same subcarrier with OFDM and 64-state quadrature amplitude modulation (QAM) as specified by IEEE 802.11a/g (bottom plot).

In general, OFDM provides high data throughput and high spectral efficiency multiple access to a communications channel with low multi-path and/or delay spread distortion. However, OFDM also requires high Peak-to-Average Power Ratio (PAPR), is sensitive to Inter-Modulation Distortion (IMD) and local oscillator (LO) phase noise, and requires linear and wide bandwidth transceiver hardware. Thus testing and corrective measures are required during initial design installation or troubleshooting of an impaired OFDM transceiver.

Conventional measuring methods for OFDM-based transceivers each have disadvantages. The single-tone method is slow and requires iterative tests to cover the full bandwidth, and does not measure inter-modulation distortion (IMD). Test conditions in the multi-tone method may not match the actual application, an important consideration, and ad hoc test frequency selection leads to difficulties in comparing test results. The impulse/step response method requires high signal peak-to-average ratio for simple test vectors and extensive post-processing for complex test vectors, but provides only poor frequency resolution and does not pinpoint sources of impairment. Measurement of the error vector magnitude (EVM) involves high setup costs for the requisite customized equipment, is slow, requiring software post-processing, and does not pinpoint sources of impairment. Measurement of bit error rate (BER) requires slow and time-consuming iterative tests and does not pinpoint sources of impairment, with packet, frame, or block error rate testing having similar disadvantages.

There is, therefore, a need in the art for an improved measurement technique for multi-subcarrier wireless systems.

SUMMARY OF THE INVENTION

To address the above-discussed deficiencies of the prior art, it is a primary object of the present invention to provide, for use in a wireless transceiver, a selectively activated multi-subcarrier test vector or corresponding waveform for which all subcarriers are activated except subcarriers below a selected subcarrier fundamental and harmonics of the selected subcarrier fundamental. Use of selectively activated multi-subcarrier testing allows measurement of inter-modulation distortion, harmonic distortion, frequency response, and phase noise using a common spectrum analyzer, with individual results pinpointing sources of impairment.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIGS. 5A and 5B are frequency domain plots illustrating alternative exemplary selectively activated multi-subcarrier baseband test vectors according to other embodiments of the present invention;

DETAILED DESCRIPTION OF THE INVENTION

FIGS. 1 through 8A, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
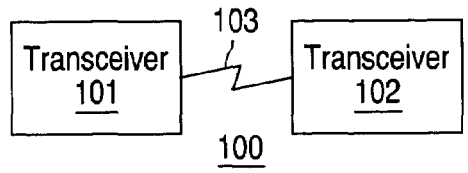
FIG. 1 is a high-level block diagram of a wireless communications system for which selectively activated multi-subcarrier measurements may be made according to one embodiment of the present invention.

FIG. 1 is a high-level block diagram of a wireless communications system for which selectively activated multi-subcarrier measurements may be made according to one embodiment of the present invention. Wireless communications system 100 includes at least two transceivers 101, 102 coupled by a wireless communications channel 103. In an exemplary embodiment, one of the transceivers 101, 102 may be, for example, an access point (AP) while the other is a wirelessly connected station (STA) such as a laptop in accordance with the American National Standards Institute/Institute for Electrical and Electronic Engineers (ANSI/IEEE) Standard 802.11b or 802.11g. In such an embodiment, wireless signals within the channel 103 are multiplexed/modulated using OFDM and 64-QAM.

Those skilled in the art will recognize that the complete structure and operation of a wireless communications system is not depicted or described herein. Instead, for simplicity and clarity, only so much of a wireless communication system as is unique to the present invention or necessary for an understanding of the present invention is depicted and described.

Any of the transceivers 101, 102 within the wireless communication system 100 may be tested for impairment using selectively activated multi-subcarrier measurements.

Figure 2A:
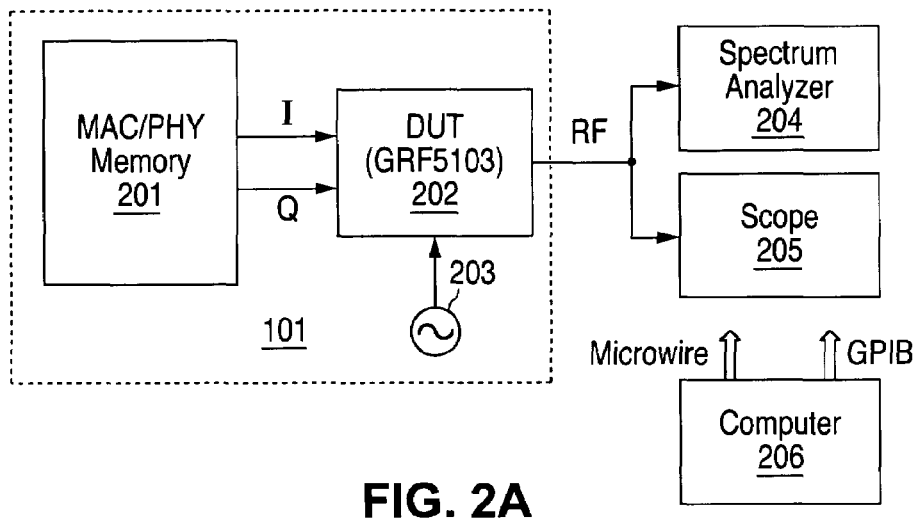
FIGS. 2A-2B are high-level block diagrams of transceiver test configurations for selectively activated multi-subcarrier measurements within a wireless communications system according to different embodiments of the present invention.
Figure 2B:
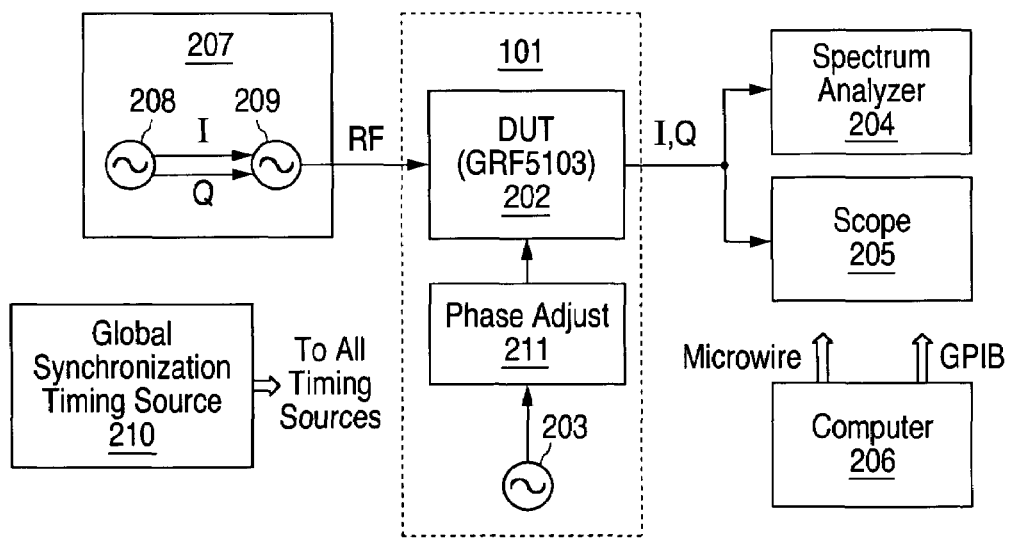

FIGS. 2A and 2B are high-level block diagrams of transceiver test configurations for selectively activated multi-subcarrier measurements within a wireless communications system according to different embodiments of the present invention. FIG. 2A depicts a low-cost test setup for selectively activated multi-subcarrier measurements on the transmitter functionality of transceiver 101 or 102. The transceiver 101 (or transceiver 102) being tested includes a Media Access Control/Physical (MAC/PHY) layer memory 201 and the device under test (DUT) 202. In an exemplary embodiment, the DUT 202 may be, for instance, a GRF5103 zero intermediate frequency (zero-IF) radio frequency (RF) 802.11b/g dual-mode WLAN transceiver circuit available from GCT Semiconductor, Inc. of San Jose, Calif.

In the approach illustrated in FIG. 2A, test vectors are loaded in either random access memory (RAM) or read-only memory (ROM) 201 of the MAC/PHY integrated circuit for the transceiver. A precision vector generator, as described below in connection with FIG. 2B, may alternatively be employed in lieu of test vectors loaded into memory 201.

In-phase (I) and quadrature-phase (Q) signals are obtained from the outputs of the on-chip analog-to-digital converters within the MAC/PHY integrated circuit including memory 201, and are passed as baseband inputs to the DUT 202—that is, the physical media dependent (PMD) layer. A 40 megaHertz (MHz) reference signal from clock generator 203 is also passed to the DUT 202, and the RF output from DUT 202 is sent to a spectrum analyzer 204, an oscilloscope 205, or both. A computer 206 coupled to the spectrum analyzer 204 and/or scope 205 by a microwire control bus or a General Purpose Interface Bus (GPIB) according to IEEE 488.1 may control operation of the analyzer 204 and/or scope 205, collect data, or perform other functions.

FIG. 2B depicts a precision test setup for selectively activated multi-subcarrier measurements on the receiver functionality of transceiver 101 or 102. A precision vector generator 207 is employed, including an arbitrary waveform generator 208 producing I and Q signals and an RF signal generator 209 receiving the I and Q signals and generating an RF signal input to the DUT 202. The baseband output I and Q from DUT 202 are passed to spectrum analyzer 204 and/or scope 205, which may be coupled to computer 206 in the same manner and for the same reasons described above. A global synchronization timing source 210 is included for synchronizing operation of the components.

In the embodiment of FIG. 2B, a phase adjust 211 is included between clock generator 203 and DUT 202. To observe the combined I and Q spectrum with either the I or Q output, the MaxHold function on the spectrum analyzer 204 should be enabled and phase of signal from the local oscillator 203 stepped by phase adjust 211 before being passed to DUT 202.

Figure 3:
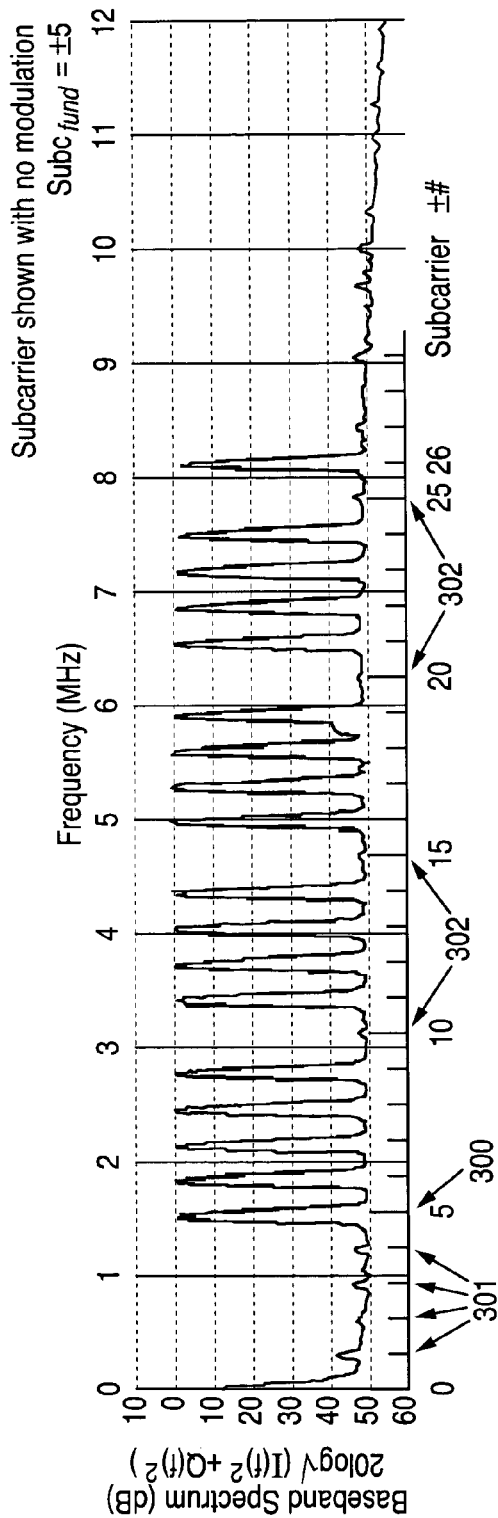
FIG. 3 is a frequency domain plot illustrating an exemplary selectively activated multi-subcarrier baseband spectrum for a test vector according to one embodiment of the present invention.
Figure 4:
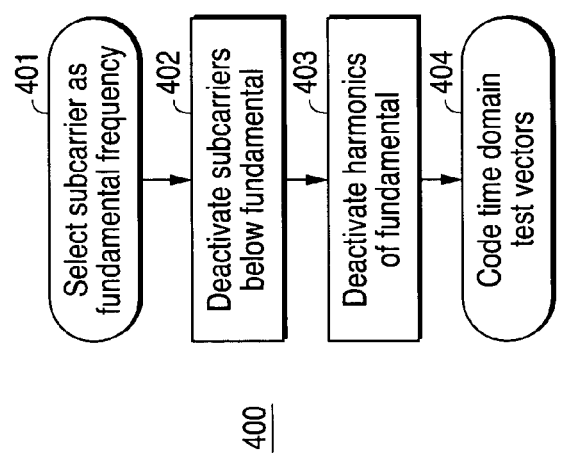
FIG. 4 is a high level flowchart for a process of selectively activated multi-subcarrier in-phase and quadrature-phase test vector coding according to one embodiment of the present invention.

FIG. 3 is a frequency domain plot illustrating an exemplary selectively activated multi-subcarrier baseband spectrum for a test vector according to one embodiment of the present invention. FIG. 4 is a high level flowchart for a process of selectively activated multi-subcarrier in-phase and quadrature-phase test vector coding according to one embodiment of the present invention. The process 400 depicted in FIG. 4 is employed to derive selectively activated multi-subcarrier vectors, such as that depicted in FIG. 3, for use in test configurations such as those depicted in FIGS. 2A and 2B.

FIG. 3 illustrates selectively activated multi-subcarrier baseband spectrum signals, in decibels, at the receive outputs of DUT 202, computed from:

$$20 \log \sqrt{I(f)^2 + Q(f)^2}$$

where I(f) is the in-phase output at frequency f and Q(f) is the quadrature-phase output at frequency f. The output signal is plotted against subcarrier number and frequency offset for a band, where subcarriers +M and −N (M=N) occupy the same baseband frequency and the subcarrier is shown with no modulation.

The process 400 of coding a selectively activated multi-subcarrier vector begins with selection of a subcarrier as the fundamental frequency for the purposes of testing (step 401). In the example of FIG. 3, a subcarrier fundamental $Subc_{fund}=\pm5$ is selected, indicated by reference character 300. Selection of subcarrier number ±5 represents an acceptable compromise between selecting a fundamental sufficiently close to the bottom while leaving subcarrier frequencies available for detection of inter-modulation distortion as described below.

All subcarriers 301 below the selected fundamental $Subc_{fund}$ are deactivated (step 402), which includes subcarrier numbers ±1 through ±4 for the example of FIG. 3. In addition, all subcarriers 302 that are harmonics of the selected fundamental Subc$_{fund}$ are deactivated (step 403), which includes subcarrier numbers ±10, ±15, ±20 and ±25 for the example of FIG. 3. Finally, time domain I/Q baseband test vectors for the subcarriers that remain activated are coded (step 404), which includes subcarrier numbers ±5 through ±9, ±11 through ±14, ±16 through ±19, ±21 through ±24, and ±26 for the example of FIG. 3.

FIGS. 5A and 5B are plots illustrating alternative exemplary selectively activated multi-subcarrier baseband test vectors according to other embodiments of the present invention. The plots illustrated are for a selected subcarrier fundamental Subc$_{fund}$=±3 and Subc$_{fund}$=±4, respectively, derived utilizing the process of FIG. 4 and suitable for use in test configurations such as those depicted in FIGS. 2A and 2B. Selection of subcarrier numbers ±3, ±4 and ±5 in FIGS. 3 and 5A-5B is arbitrary, and other subcarrier numbers may be selected as the fundamental.

Figure 6:
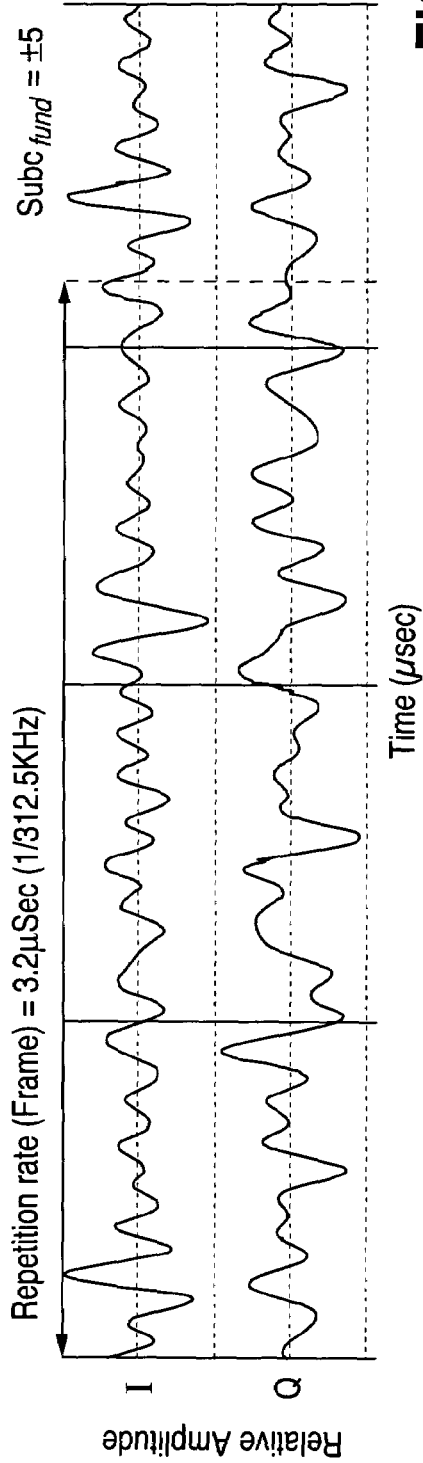
FIG. 6 is a plot of selectively activated multi-subcarrier in-phase and quadrature-phase baseband waveforms according to one embodiment of the present invention.

FIG. 6 is a plot of selectively activated multi-subcarrier in-phase and quadrature-phase baseband waveforms according to one embodiment of the present invention. Such waveforms are employed to test the transmitter portion of DUT 202, as shown in FIG. 2A. The I/Q baseband waveforms depicted correspond to the frequency domain test vector depicted in FIG. 3, and derived by calculation of:

$$w_{SAMS}(t) = \sum_{k=-\frac{N_{ST}}{2}}^{\frac{N_{ST}}{2}} S_k e^{j(2\pi k \Delta f)(t+D_k)}$$

$$I = Re(w_{SAMS}(t))$$

$$Q = Im(w_{SAMS}(t))$$

where $N_{ST}$ is the total number of subcarriers, from −26 to +26 in the exemplary embodiment of FIG. 3; $S_K$ is the subcarrier activation indicator, where a 1 indicates the respective subcarrier is activated and a 0 indicates the respective subcarrier is deactivated; Δf is the subcarrier frequency spacing, which is 312.5 kiloHertz (KHz) in the exemplary embodiment; and $D_K$ is a random delay variable for reducing signal peak-to-average ratio. As indicated, I and Q are the real and imaginary portions, respectively, of $W_{SAMS}$.

The random delay variable $D_K$ employed in generating the I and Q baseband waveforms should be assigned values that do not interfere with test results. In the impulse/step response measurement method, for example, the peak-to-average signal ratio may be too high. By using a random sequence for delay variable $D_K$, the peaks are spread, which is acceptable since phase is not a matter of concern during testing.

Various implementation options may be employed with the I and Q baseband waveform as illustrated: subcarrier modulation, such as quadrature amplitude modulation (QAM), may be added; additional subcarriers may be added to improve frequency resolution; several frames of I and Q baseband waveforms, each with different sets of subcarrier activation indicators $S_K$, may be concatenated to form the test signal; a guard interval may be added in accordance with IEEE 802.11a.g; and specific subcarriers may be deactivated to uncover co-channel inter-modulation distortion (IMD). In addition, various modifications to the test configurations of FIGS. 2A and 2B may be employed, such as frame-based fast Fourier transform/discrete Fourier transform (FFT/DFT) conversion in lieu of spectrum analyzer 204.

Figure 7:
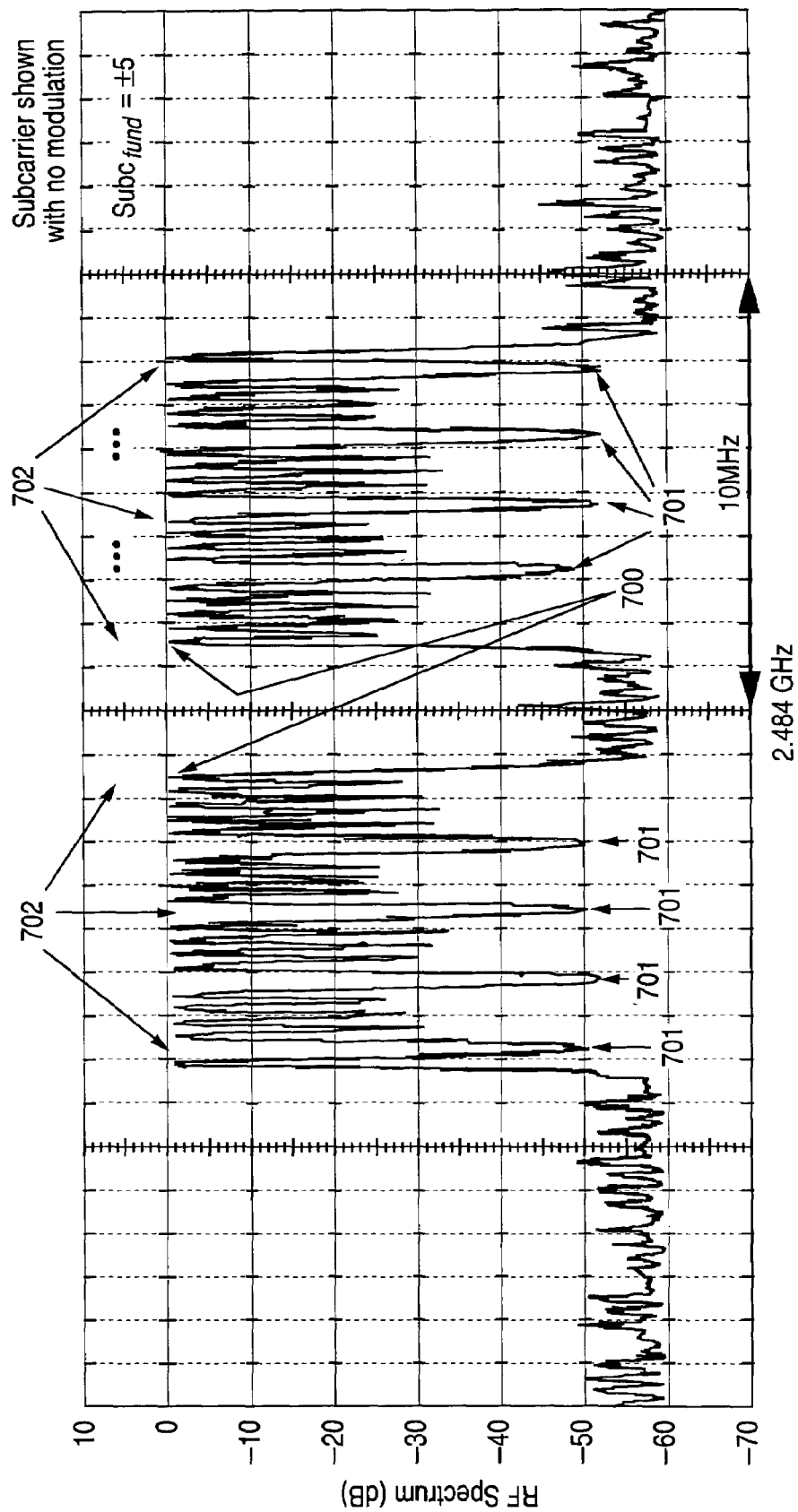
FIG. 7 is a plot of selectively activated multi-subcarrier radio frequency waveforms according to one embodiment of the present invention.

FIG. 7 is a plot of selectively activated multi-subcarrier radio frequency waveforms according to one embodiment of the present invention. Such waveforms are employed to test the receiver portion of DUT 202, as shown in FIG. 2B. The radio frequency (RF) waveform depicted corresponds to the frequency domain test vector depicted in FIG. 3. As illustrated, subcarriers below the selected fundamental (±5) 700 are deactivated (±1 through ±4 in the example shown), as are the harmonics 701 of the fundamental (±10, ±15, ±20 and ±25 in the example shown). The remaining subcarriers 702 are activated (±6 through ±9, ±11 through ±14, ±16 through ±19, ±21 through ±24, and ±26 in the example shown).

Figure 8:
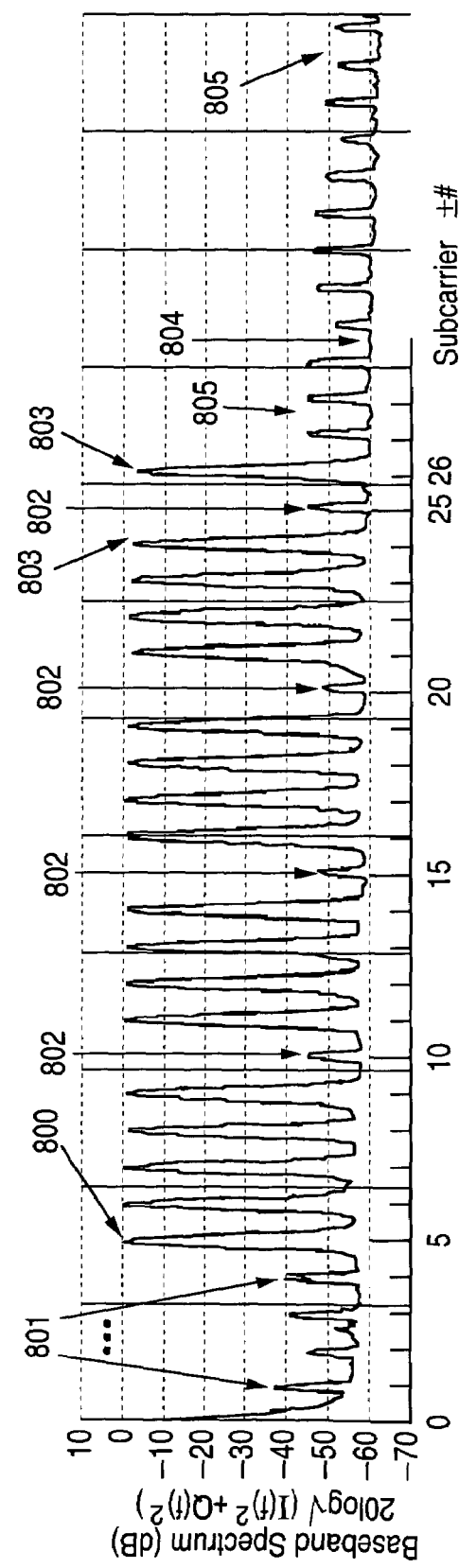
FIGS. 8 and 8A illustrate diagnosis of wireless communication transceiver performance utilizing selectively activated multi-subcarrier measurements according to different embodiments of the present invention.
Figure 8A:
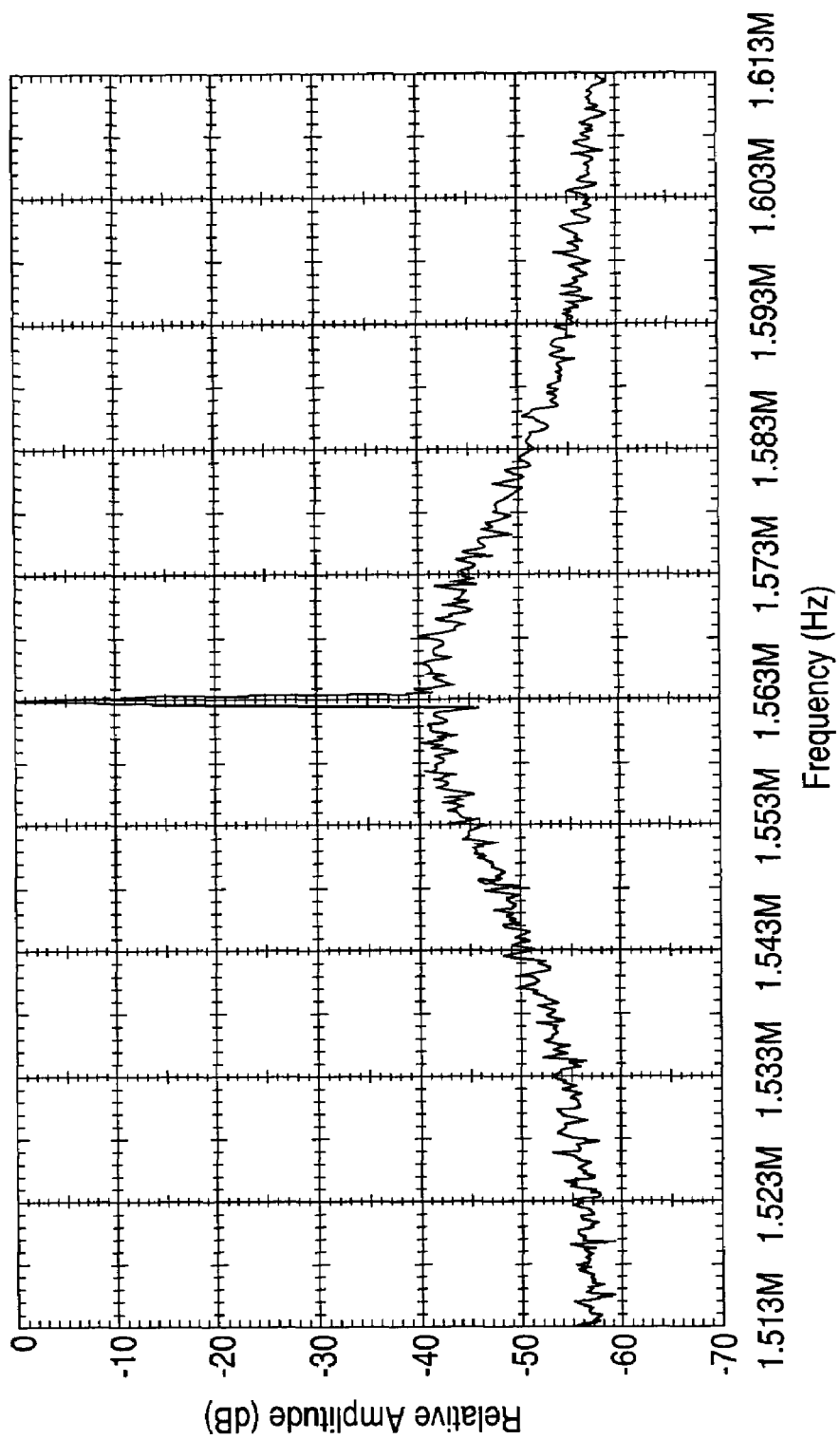
Figure 9:
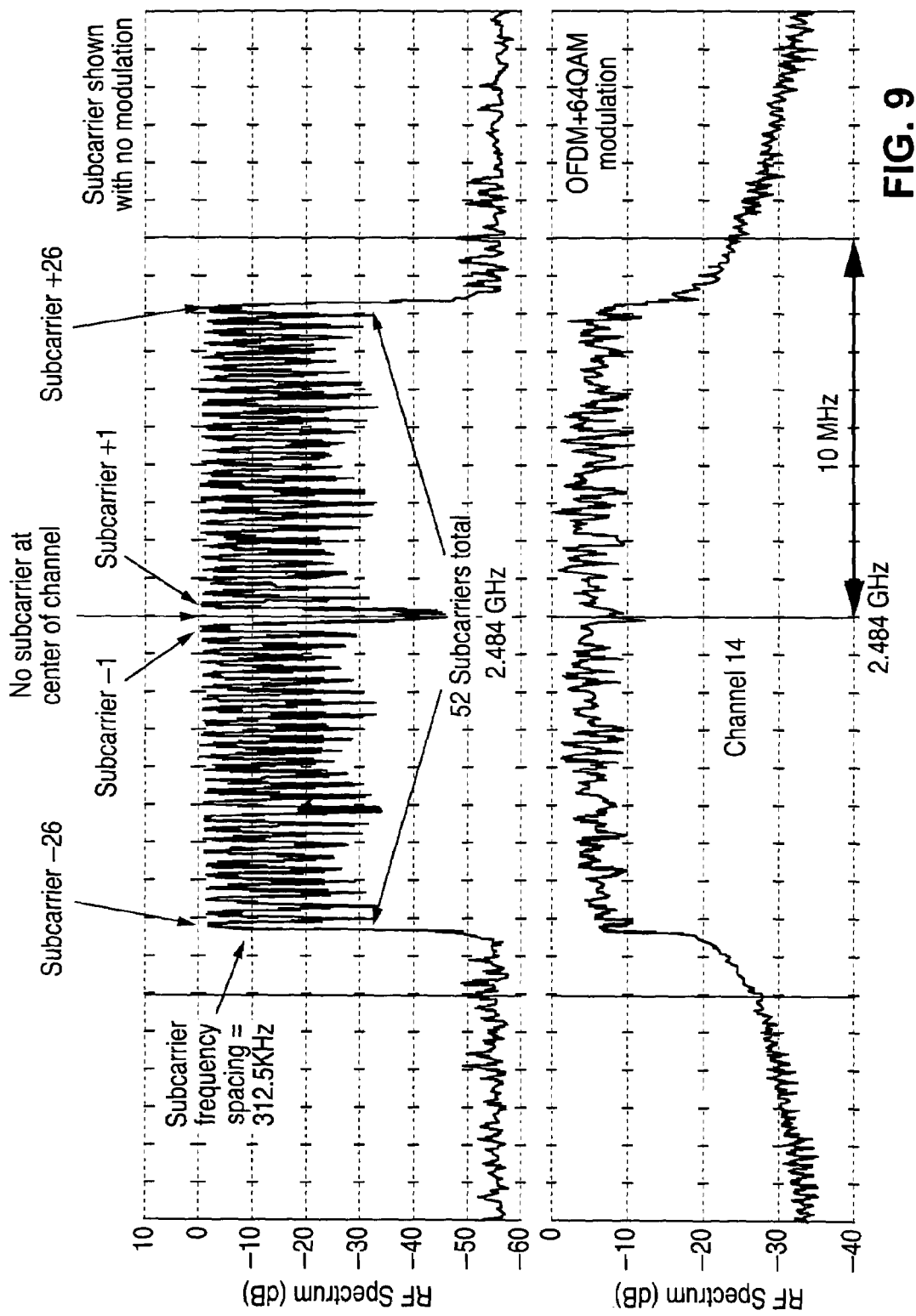
FIG. 9 depicts an orthogonal frequency division multiplexed, unmodulated subcarrier and an orthogonal frequency division multiplexed subcarrier with 64-state quadrature amplitude modulation.

FIGS. 8 and 8A illustrate diagnosis of wireless communication transceiver performance utilizing selectively activated multi-subcarrier measurements according to different embodiments of the present invention. The plot depicted corresponds to use of the test vector of FIG. 3 and the waveforms of FIGS. 6 and 7. Use of selectively activated multi-subcarrier test vectors and waveforms of the type described above allow detection of inter-modulation distortion (IMD) and harmonic distortion (HD).

Inter-modulation distortion components appear at frequencies mfx±nfy, where m and n are integers and fx and fy are any of the subcarrier frequencies. The strongest inter-modulation distortion is usually found at the frequency of subcarrier number ±1. However, in the present invention, all subcarriers 801 below the selected fundamental 800 are deactivated to allow for detection of inter-modulation distortion.

For harmonic distortion, the second harmonic (subcarrier number ±10 in the exemplary embodiment) usually dominates the magnitude of such distortion. However, in the present invention, all harmonics 802 of the fundamental, including the third, fourth and fifth harmonics, as well as the second harmonic, are suppressed.

Frequency response of the DUT 202 may be calculated from amplitude loss of the activated subcarriers 803. As noted above, an FFT/DFT may be run on the I/Q signals to obtain phase values. Above the highest subcarrier (subcarrier number ±26 in the exemplary embodiment), the noise floor and interference 804 may be measured, together with high-order inter-modulation distortion and harmonic distortion 805. Phase noise may be measured by zooming in on the selected fundamental subcarrier 800 (1.5625 megaHertz in the exemplary embodiment) as illustrated in FIG. 8A.

Selectively activated multi-subcarrier testing in accordance with the present invention is a fast and low cost radio transceiver measuring technique utilizing a built-in modulation vector generator in the transceiver circuit. This diagnostic tool allows the user or designer to perform measurements and pinpoint the sources of impairment so that correction modifications to the circuit may be made, if necessary. Targeting wide-band multi-carrier or multi-subcarrier systems, one application is OFDM-based transceivers.

Use of selectively activated multi-subcarrier testing provides fast, non-iterative testing in which, significantly, the test conditions more closely match actual applications than other testing methods. Both transmit and receive paths may be tested, with measurement of inter-modulation distortion, harmonic distortion, frequency response, and phase noise. The detecting device may be a commonly available spectrum analyzer. Individual results depict sources of impairment, but fails to provide an overall performance index, for which error vector magnitude or bit error rate tests may be employed.

Selectively activated multi-subcarrier testing is a versatile add-on function for any modern radio transceiver, with minimal hardware overhead costs yet substantial return in pinpointing problem sources when conventional diagnostic methods fail. As future radio development continuously widens the channel bandwidth, system integration is increasing, making built-in diagnostic tests such as selectively activated multi-subcarrier measurement crucial.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A wireless transceiver comprising:
    a wireless transmitter or receiver circuit associated with a set of subcarriers; and
    at least one of:
    a memory containing a test vector for use in generating waveforms for testing the wireless transmitter or receiver circuit separate from any wireless communication channel, the test vector coding (i) deactivation of subcarriers below a selected subcarrier fundamental and harmonics of the selected subcarrier fundamental within the set and (ii) activation of remaining subcarriers within the set, and
    a signal generator generating a waveform corresponding to the test vector.

2. The wireless transceiver according to claim 1, wherein the deactivated subcarriers include a bottom subcarrier.

3. The wireless transceiver according to claim 1, wherein the wireless transceiver comprises the memory containing the test vector.

4. The wireless transceiver according to claim 3, wherein in-phase (I) and quadrature-phase (Q) signals based on the test vector stored in the memory are provided to the wireless transmitter or receiver circuit.

5. The wireless transceiver according to claim 1, wherein the subcarrier fundamental is selected to enable measurement of inter-modulation distortion.

6. The wireless transceiver according to claim 1, wherein the wireless transceiver comprises the signal generator.

7. The wireless transceiver according to claim 6, wherein the signal generator comprises an arbitrary waveform generator configured to produce in-phase (I) and quadrature-phase (Q) signals and an RF signal generator configured to receive the I and Q signals and generate an RF signal that is input to the wireless transmitter or receiver circuit.

8. The wireless transceiver according to claim 1, wherein the test vector codes:
    deactivation of all subcarriers below the selected subcarrier fundamental within the set;
    deactivation of all harmonics of the selected subcarrier fundamental within the set; and
    activation of all remaining subcarriers within the set.

9. A wireless communication station including the wireless transceiver according to claim 1, wherein the wireless communication station is communicably coupled to a wireless communication channel.

10. A wireless communication system including the wireless communication station according to claim 9, the wireless communication system further comprising:
    a second wireless communication station communicably coupled to the wireless communication channel.

11. A method of enabling testing of a wireless transceiver comprising:
    providing at least one of: (i) a test vector for use in generating waveforms for testing a wireless transmitter or receiver separate from any wireless communication channel and (ii) a waveform corresponding to the test vector, the wireless transmitter or receiver associated with a set of subcarriers, the test vector coding:
    deactivation of subcarriers below a selected subcarrier fundamental and harmonics of the selected subcarrier fundamental within the set; and
    activation of remaining subcarriers within the set.

12. The method according to claim 11, wherein the deactivated subcarriers include a bottom subcarrier.

13. The method according to claim 11, wherein the step of providing comprises providing the test vector and using the provided test vector to generate the waveforms for testing the wireless transmitter or receiver.

14. The method according to claim 13, wherein using the provided test vector to generate the waveforms comprises generating in-phase (I) and quadrature-phase (Q) signals based on the provided test vector.

15. The method according to claim 11, further comprising:
    selecting the subcarrier fundamental to enable measurement of inter-modulation distortion.

16. The method according to claim 11, wherein the step of providing comprises providing the waveform corresponding to the test vector.

17. The method according to claim 16, wherein providing the waveform comprises producing in-phase (I) and quadrature-phase (Q) signals and generating an RF signal using the I and Q signals.

18. The method according to claim 11, wherein the test vector codes:
    deactivation of all subcarriers below the selected subcarrier fundamental within the set;
    deactivation of all harmonics of the selected subcarrier fundamental within the set; and
    activation of all remaining subcarriers within the set.

19. A test signal within a tangible storage medium, the test signal comprising:
    coding for selectively activating and deactivating subcarriers within a set of subcarriers, the coding:
    deactivating subcarriers below a selected subcarrier fundamental and harmonics of the selected subcarrier fundamental, wherein the deactivated subcarriers are selected for testing a wireless transmitter or receiver circuit separate from any wireless communication channel, and
    activating remaining subcarriers within the set.

20. The test signal according to claim 19, wherein the coding deactivates all subcarriers below the selected subcarrier fundamental and all harmonics of the selected subcarrier fundamental and activates all remaining subcarriers within the set.

* * * * *